US007478323B2

(12) United States Patent
Dowdy

(10) Patent No.: US 7,478,323 B2
(45) Date of Patent: Jan. 13, 2009

(54) AUTOMATED CREATION OF MEDIA ASSET ILLUSTRATION COLLAGE

(75) Inventor: Thomas Dowdy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 11/078,583

(22) Filed: Mar. 11, 2005

(65) Prior Publication Data

US 2006/0206811 A1 Sep. 14, 2006

Related U.S. Application Data

(60) Provisional application No. 60/622,280, filed on Oct. 25, 2004.

(51) Int. Cl.
*G06F 15/00* (2006.01)
*G06F 17/00* (2006.01)

(52) U.S. Cl. ....................... 715/253; 715/243; 715/273; 715/274; 715/275; 715/277

(58) Field of Classification Search ................. 715/526, 715/527, 528; 382/162, 168; 345/589–598
See application file for complete search history.

(56) References Cited

U.S. PATENT DOCUMENTS 5,459,824 A * 10/1995 Kashiwazaki ............... 345/593
2002/0027561 A1* 3/2002 Wu ........................... 345/593
2002/0054079 A1* 5/2002 Russel ........................ 345/738
2002/0193895 A1* 12/2002 Qian et al. ..................... 700/94
2003/0107585 A1* 6/2003 Samuelson .................. 345/629
2003/0174882 A1* 9/2003 Turpin et al. ................ 382/162
2004/0054542 A1* 3/2004 Foote et al. ................. 704/500
2004/0071922 A1* 4/2004 McCarthy et al. ............. 428/43
2004/0164991 A1 8/2004 Rose
2005/0031197 A1* 2/2005 Knopp ....................... 382/154
2005/0141771 A1* 6/2005 Yamakado et al. .......... 382/232
2006/0066627 A1* 3/2006 Gerhard et al. .............. 345/593

OTHER PUBLICATIONS

Miser et al., iPod + iTunes Starter Kit, Publisher: Que, Pub Date: Dec. 1, 2004, pp. 1-12.*

Chopde, Avinash, CD/DVD Inserts and Envelopes, Nov. 2003, cdlablegen, version 3.0.0, pp. 1-5.*

(Continued)

*Primary Examiner*—Doug Hutton
*Assistant Examiner*—Nathan Hillery

(57) ABSTRACT

Techniques for producing a media asset illustration collage are disclosed. These techniques involve, for instance, obtaining a media asset list containing media asset information, obtaining one or more media asset illustrations associated with the media asset list, determining a color scheme based on the one or more media asset illustrations, and producing a media asset illustration collage according to the color scheme. Further, these techniques involve analyzing the one or more media asset illustrations, determining, based on the analysis, one or more dominant colors for each of the media asset illustrations, determining, based on one or more of the dominant colors, one or more alternate colors for each of the media asset illustrations, prioritizing the one or more media asset illustrations based on the media asset list, selecting one or more the of the determined dominant colors from the media asset illustration having the highest priority, and creating the color scheme for the media asset illustration collage based on the selected dominant color.

34 Claims, 15 Drawing Sheets
(2 of 15 Drawing Sheet(s) Filed in Color)

OTHER PUBLICATIONS

Obrador, Pere, Automatic color scheme picker for document templates based on image analysis and dual problem, Jan. 19, 2006, Hewlett-Packard Laboratories, pp. 1-10.*

"Color Terminology," Carnright Design, 2004, downloaded from www.carnrightdesign.com/color4business/speaking_color.htm on Jan. 13, 2005.

"Color Wheel," downloaded from http://hort.ifas.ufl.edu/TEACH/floral/color.htm on Jan. 13, 2005.

"Complimentary Chromatic Colors," downloaded from www.smartpixel.net/chromoweb/uks/indexgb.html on Nov. 22, 2004.

"Color and Vision Questions and Answers," Color Vision FAQ, downloaded from www.cis.rit.edu/mcsl/faq/faql.shtml on Nov. 22, 2004.

Moretti, et al., "Tools for the Selection of Colour Palettes," Institute of Information Sciences and Technology Massey University, New Zealand.

* cited by examiner $\theta_1 = 180°$ $\theta_1 = \theta_2 = \theta_3 = 120°$ $\theta_1 = \theta_2$ $\theta_1 = \theta_2 = 90^\circ$ $\theta_1 = \theta_2$

AUTOMATED CREATION OF MEDIA ASSET ILLUSTRATION COLLAGE

CROSS REFERENCE TO RELATED APPLICATIONS

This application is related to U.S. Provisional Patent Application No. 60/622,280, filed on Oct. 25, 2004 and entitled "Online Purchase of Digital Media Bundles", and hereby incorporated herein by refererence.

BACKGROUND OF THE INVENTION

1. Field of the Invention

In general, the invention relates to media management applications, and, more particularly, to using a media management application to create and print illustrated labels for media asset collections.

2. Description of the Related Art

Traditionally, music has been purchased at music stores or music departments of larger stores. A consumer will visit the music store or department and manually browse for albums or compact discs (CDs) of interest. After the consumer selects an album or CD of interest, the consumer proceeds to a checkout register to pay for the album or CD being purchased.

In recent years music delivery or distribution over the Internet has become popular. Due to the advances in efficient file formats, such as MP3 and MPEG4, the size of media files has become small enough to make their download via the Internet practical. Also, technological advances have led to higher-speed Internet connections and lower cost of memory. The combination of these advances make downloading media files, such as for music and videos, manageable and not too time consuming.

One popular approach to online music distribution is Apple Computer's iTunes® online music store. Consumers may use the iTunes® online music store to purchase music either as individual music tracks or in albums of songs. Other music stores such as Rhapsody™ and Napster™ have also been employed to purchase music online.

In many instances, consumers who have purchased music using an online media store are given permission under a purchase or license agreement to create (burn) CDs, DVDs, or other removable media that contain the music they have purchased from the online music store for personal use. Generally, burning is performed using a removable media drive (e.g., CD-RW) in conjunction with an application running on a client computer. For example, if a consumer has a personal computer with a CD burner, the iTunes® client application allows the consumer to burn a CD. For example, the consumer may purchase a media asset collection or compilation online. Generally speaking, a media asset collection/compilation is typically a grouping of one or more media assets, selected by a user (e.g., a custom playlist) or a media publisher (e.g., album, boxset, video collection, etc.).

If the consumer decides to burn a collection/compilation to a removable medium such as a CD, DVD, or MiniDisk™, that user might also desire an attractive illustrated label to go along with it. Some media management applications, such as MusicMatch Jukebox™ and Apple Computer's iTunes®, allow the user to create labels for the media they have burned (or intend to burn), which can then be printed using a printer. For example, a label can be an insert for a CD jewel case that includes one or more media asset illustrations associated with the songs that have been burned to the CD as well as a list of songs that have been burned to the CD.

Unfortunately, a user generally has few options in the selection of the colors that will be used to create jewel case in for a media asset collection/compilation. Typically, the user is not given a choice as to the colors used in the creation of the illustrated label. However, giving the user too much control over color selection may not be desirable to many users who are not interested in "eyeballing" or estimating which colors will be aesthetically pleasing. Thus, there is a need for techniques to automate color selection in the creation of CD jewel cases and other color labels that can be created to accompany burned media.

SUMMARY OF THE INVENTION

The invention pertains to techniques for creating and/or printing a media asset illustration collage that can be used as a label to adorn a removable media or a removable media storage container, for example a CD or CD jewel case, respectively. These techniques use color selection techniques to automatically select colors based on one or more media asset illustrations. Further, the color selection is performed in such a way as to present an aesthetically pleasing color combination (color scheme) for a media asset illustration collage. The invention can be implemented in numerous ways, including as a method, system, device, apparatus, graphical user interface, or computer readable medium. Several embodiments of the invention are discussed below.

In one embodiment of the invention, a media asset illustration collage is produced by first obtaining a media asset list containing media asset information, obtaining one or more media asset illustrations associated with the media asset list, determining a color scheme based on the one or more media asset illustrations, and then producing a media asset illustration collage according to the color scheme. The media asset illustrations can be album cover art or other images associated with a media asset, such as promotional photographs or logos. These illustrations may be contained within individual media assets (e.g., a graphic file contained in the headers of a music file) or may be separate from the associated media assets.

In another embodiment of the invention, the production of the media asset illustration collage further involves producing a track listing including media asset information (e.g., title, artist information, etc.) and incorporating it into the media asset collage.

In some embodiments of the invention, the media asset collage incorporates a front (first) and rear (second) panel, where the front panel contains one or more of the media asset illustrations and the rear panel contains the track listing. In one implementation, the front panel is a mosaic of one or more of the media asset illustrations and the rear panel is a reproduction of the front panel using a monochromatic color scheme based on a dominant color.

Still another embodiment of the invention, further involves determining the color scheme by analyzing the one or more media asset illustrations, determining, based on the analysis, one or more dominant colors for each of the media asset illustrations, determining, based on one or more of the dominant colors, one or more alternate colors for each of the media asset illustrations, prioritizing the one or more media asset illustrations based on the list of media asset information, selecting one or more the of the determined dominant colors from the media asset illustration having the highest priority, and creating the color scheme for the media asset illustration collage based on the selected dominant color.

One embodiment of the invention prioritizes the media asset illustrations by counting the number of media assets on the media asset list that are associated with each illustration and assigning the highest priority to the media asset illustrations with the greatest number of associated media assets.

In one embodiment of the invention, a media asset illustration collages is produced by obtaining a media asset list containing media asset information, obtaining one or more media asset illustrations associated with the media asset list, analyzing the one or media asset illustrations, determining, based on the analysis, one or more dominant colors for each of the media asset illustrations, determining, based on one or more of the dominant colors, one or more alternate colors for each of the media asset illustrations, prioritizing the one or more media asset illustrations based on the list of media asset information, selecting one or more the of the determined dominant colors from the media asset illustration having the highest priority, creating a color scheme for the media asset illustration collage based on the selected dominant color, producing a media asset illustration collage according to the color scheme, and printing the media asset illustration collage.

Other aspects and advantages of the invention will become apparent from the following detailed description taken in conjunction with the accompanying drawings which illustrate, by way of example, the principles of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be readily understood by the following detailed description in conjunction with the accompanying drawings, wherein like reference numerals designate like structural elements, and in which.

DETAILED DESCRIPTION OF THE INVENTION

Broadly speaking, the invention pertains to techniques for creating and/or printing a media asset illustration collage that can be used as a label to adorn a removable media or a removable media storage container, for example, a CD or CD jewel case, respectively. These techniques use color selection techniques to automatically select colors based on one or more media asset illustrations. Further, the color selection is performed in such a way as to present an aesthetically pleasing color combination (color scheme) for a media asset illustration collage.

Generally, a media asset illustration collage is an illustrated label that accompanies a media asset collection or compilation, such as a CD jewel case insert, DVD case insert, MiniDisk™ case insert, or a label that is applied directly to the media (typically on a non-playable surface). Typically, the media asset illustration collage is formed from one or more media asset illustrations (e.g., album cover graphics) combined into a single illustration. Possible arrangements include mosaics, grids, and overlays, as well as other patterns. The media asset illustrations in the collage can all be the same size or size can be adjusted according to a user or application determined media asset illustration priority.

Figure 1:
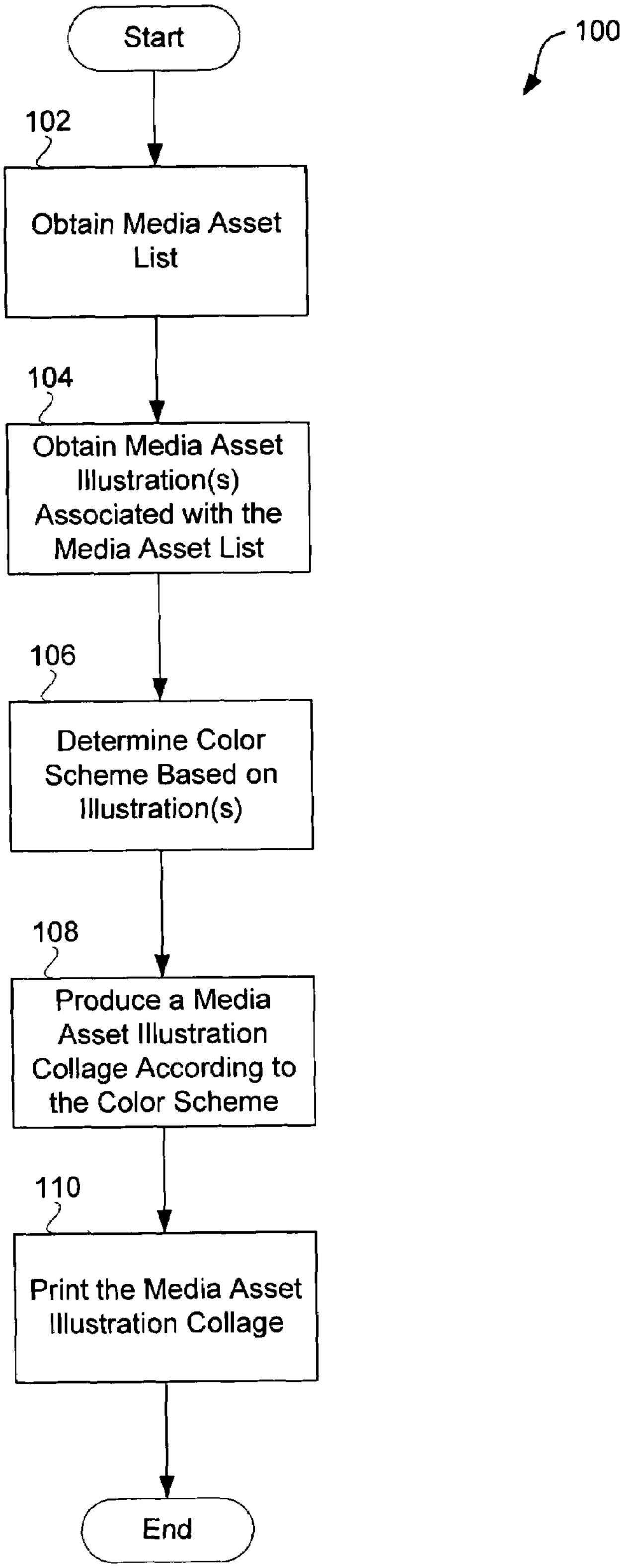
FIG. 1 is a flow diagram of a media asset illustration collage creation process according to one embodiment of the invention.

FIG. 1 is a flow diagram of a media asset illustration collage creation process 100 according to one embodiment of the invention. The media asset illustration collage creation process is performed, for example, using a media management application. One example of a music management program is iTunes®, produced by Apple Computer, Inc. of Cupertino, Calif.

The media asset illustration collage creation process 100 begins with obtaining 102 a media asset list. The media asset list contains information relating to media assets (e.g., songs) on the media asset list. Such information can include, but not limited to, media asset title (e.g., song title), media asset composer (e.g., artist name), and media asset compilation (e.g., album name). Next, any media asset illustrations associated with the media asset list are obtained 104. These media asset illustrations can include, for example, album cover art or photographs associated with a particular media asset. In some embodiments of the invention, the aforementioned media asset illustrations are contained within individual media assets. In these embodiments, media asset illustrations can be stored in the file headers of a particular media asset.

Once the media asset illustrations associated with the media asset list have been obtained 104, a color scheme is determined 106 based on the illustrations. This determination 106 is typically some form of weighted color analysis, one embodiment of which is described below in reference to FIG. 3.

Next, a media asset illustration collage is produced 108 according to the color scheme. In one embodiment of the invention, the media asset illustration collage is produced by arranging one or more of the media asset illustrations associated with the media asset list in a tiled pattern (e.g., in a grid or mosaic). Finally, the media asset illustration collage can be printed 110. Once printed, the media asset illustration collage is available for use as a jewel case insert or label.

Figure 2A:
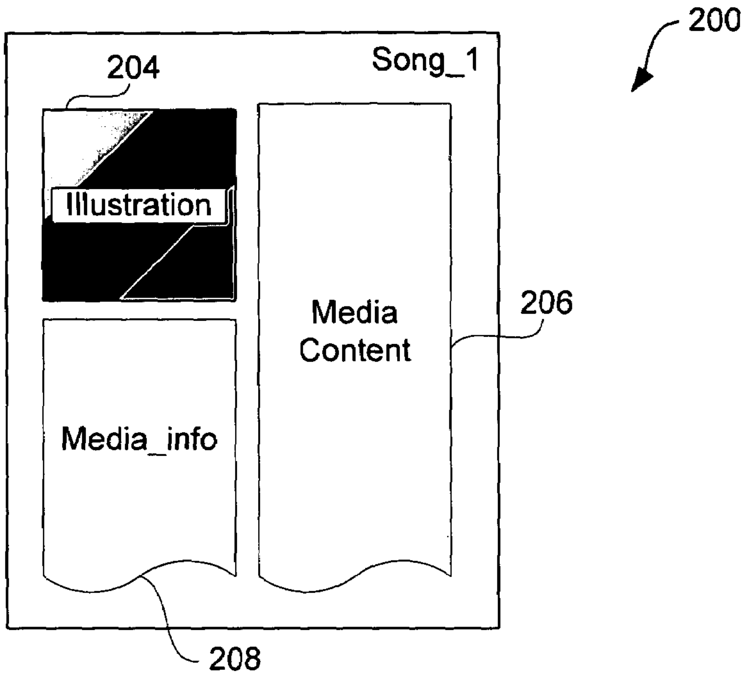
FIG. 2A is a diagram of a media asset according to one embodiment of the invention.

FIG. 2A is a diagram of a media asset 200 according to one embodiment of the invention. The media asset 200 shown is a song file, for example an MP3 or AAC file, although any media file type may be used.

The media asset 200 contains one or more data segments including a data segment containing media content 206, a data segment containing media information 208, and a data segment containing a media asset illustration 204. In one embodiment of the invention, the media content 206 is a song, and the media information 208 is song information, which typically includes song name, artist name, and album name, as well as other publication information. Further, in some embodiments of the invention, the media asset illustration 204 is an image of an album cover associated with the media asset 200. In other embodiments, the media asset illustration 204 can be an image of a poster, photograph, or promotional material associated with the media asset 200.

Figure 2B:
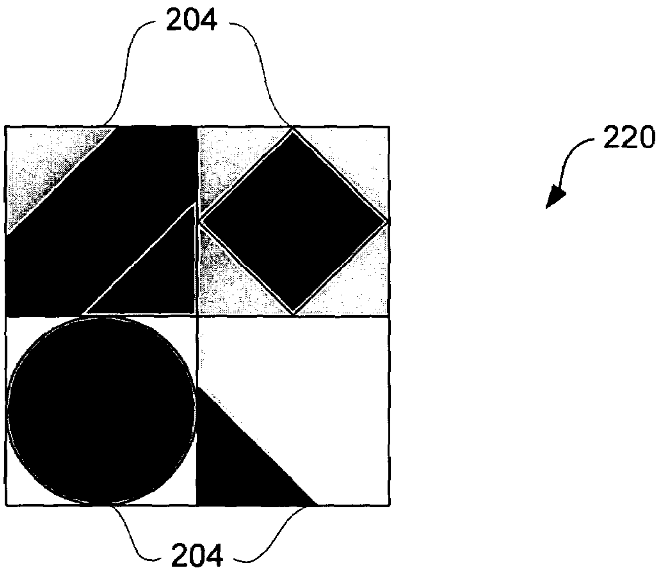
FIGS. 2B-2D are diagrams of media asset illustration collages according to various embodiment of the invention.

FIG. 2B is a diagram of a media asset illustration collage 220 according to one embodiment of the invention. The media asset illustration collage 220 shown contains four media asset illustrations 204 arranged in a two-by-two mosaic pattern, although any number of media assets 204 may be used. In one embodiment of the invention, the mosaic pattern consists of up to 25 rectangular illustrations 204 arranged in a five-by-five tiled pattern. Although the media asset illustration collage 220 is shown having a media asset illustration 204 in every position of the mosaic, in some embodiments, one or more positions in the mosaic do not contain media asset illustrations 204 and are instead left blank. In some embodiments, these blank spaces are filled with one or more colors from the color scheme determined in step 106 of FIG. 1. Further, although the mosaic pattern shown employs rectangular tiles arranged in a grid, other patterns and illustration shapes are possible (e.g., hexagonally-shaped illustrations).

Figure 2C:
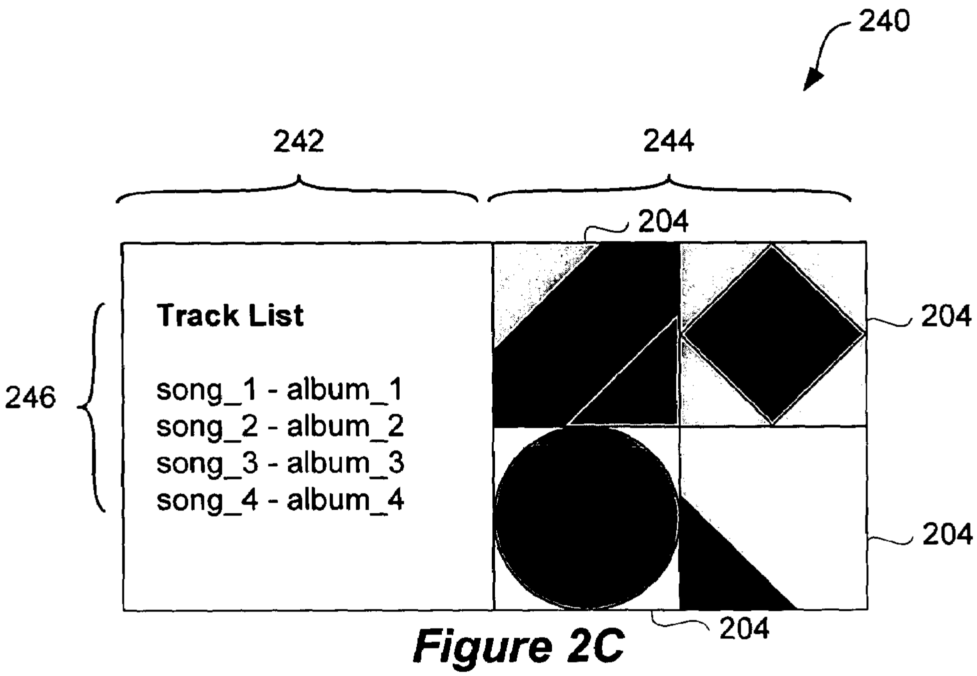

FIG. 2C is a diagram of a media asset illustration collage 240 according to another embodiment of the invention. According to some embodiments of the invention, the media asset illustration collage 240 shown is a media asset compilation case insert or label such as a CD jewel case insert or DVD case insert as described above. Generally, in the case of a media asset compilation case insert or label, the media asset illustration collage 240 indicates to the viewer of the media asset illustration collage which media assets are included on the media (e.g., CD) associated with the media asset compilation label.

The media asset illustration collage 240 includes two panels. The first panel 242 incorporates a track list 246, indicating the titles of the media assets that are contained in the media asset list upon which the media asset illustration collage 240 is based. The second panel 244 is a media asset illustration collage containing four media asset illustrations 204. Each media asset illustration is associated with a media asset displayed on the track list 246 on the first panel 242. According to some embodiments of the invention, the second panel 244 is the media asset illustration collage 220 of FIG. 2B.

Figure 2D:
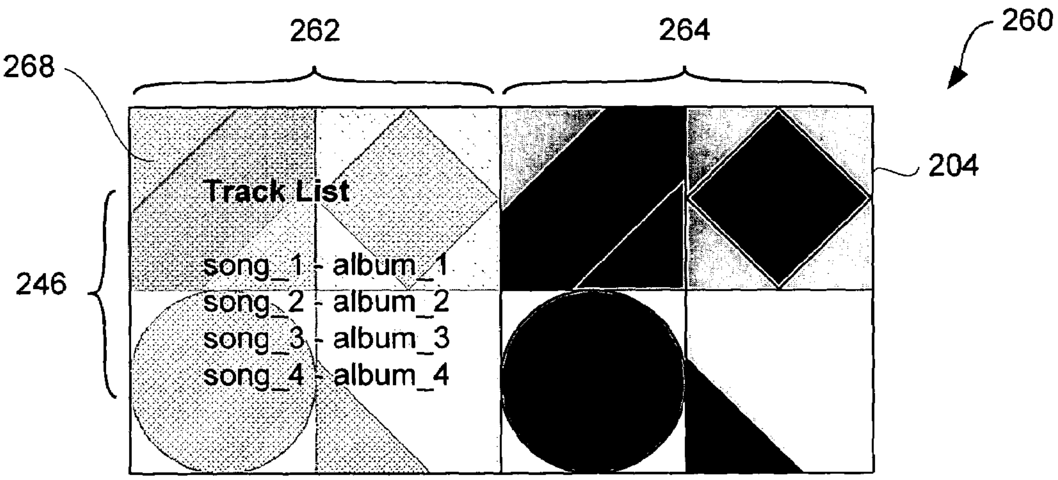

FIG. 2D is a diagram of a media asset illustration collage 260 according to still another embodiment of the invention. Like the media asset illustration collage 240 above, the media asset illustration collage 260 shown includes two panels. A first panel 262 includes a media asset list 246 superimposed over a patterned background 268. In some embodiments of the invention, the patterned background 268 incorporates substantially the same media asset illustrations 204 (arranged in the same pattern) as are visible on a second panel 264. In other embodiments of the invention, the first panel 262 incorporates different media asset illustrations 204 or a different arrangement of media asset illustrations 204 than those visible on the second panel 264. Further, in some embodiments, the patterned background 268 of first panel 262 is a monochromatic version of the second panel 264, i.e., displayed using only shades and tints of a single color (e.g., one or more colors from the color scheme determined in step 106 of FIG. 1). Also, as discussed in reference to FIG. 2C, the media asset illustration collage 260 includes the track listing 246.

Figure 3:
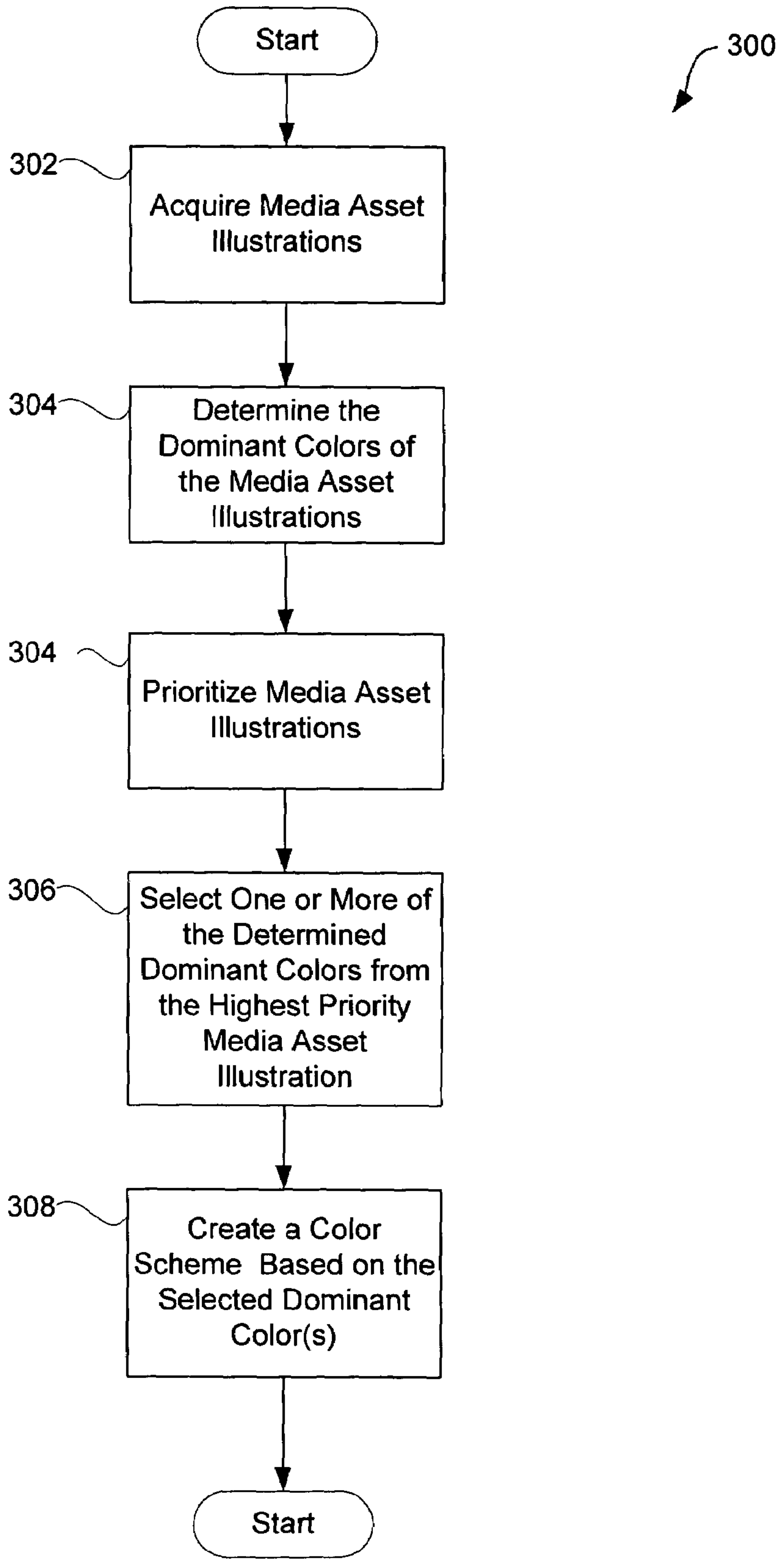
FIG. 3 is a flow diagram of a color scheme determination process according to one embodiment of the invention.

FIG. 3 is a flow diagram of a color scheme determination process 300 according to one embodiment of the invention. The color scheme determination process 300 determines a color scheme. As an example, the color scheme is used in the production 108 of the media asset illustration collage of FIG. 1.

The color scheme determination process 300 begins by acquiring 302 of one or more media asset illustrations. According to one embodiment of the invention, the media asset illustrations that are acquired 302 are the media asset illustrations associated with a media asset list, such as the media asset list discussed above in reference to operation 102 FIG. 1. Next, the acquired media asset illustrations are analyzed to determine 304 the dominant colors associated with each media asset illustration. Subsequently, the media asset illustrations are prioritized 304 according to some predetermined criteria.

In one embodiment of the invention, the media asset illustrations are prioritized 304 according to the number of media assets on a media asset list that are associated with a particular media asset illustration. For example, a sample media asset list might contain five media assets, a, b, and c, that are associated with a first media asset illustration A, and two media assets, d and e, that are associated with a second media asset illustration B. In this embodiment, illustration A is assigned a higher priority (three associated media assets) than Illustration B (two associated media assets). Of course, other prioritization schemes are possible. For example, by giving priority to media asset illustrations associated with media assets having higher user ratings (e.g., media assets that have been rated by a user using ratings scale in a media management application).

The color scheme determination process 300 continues by selecting 306 one or more dominant colors from the highest priority media asset illustration. The one or more dominant colors are then used to create 308 a color scheme.

Figure 4:
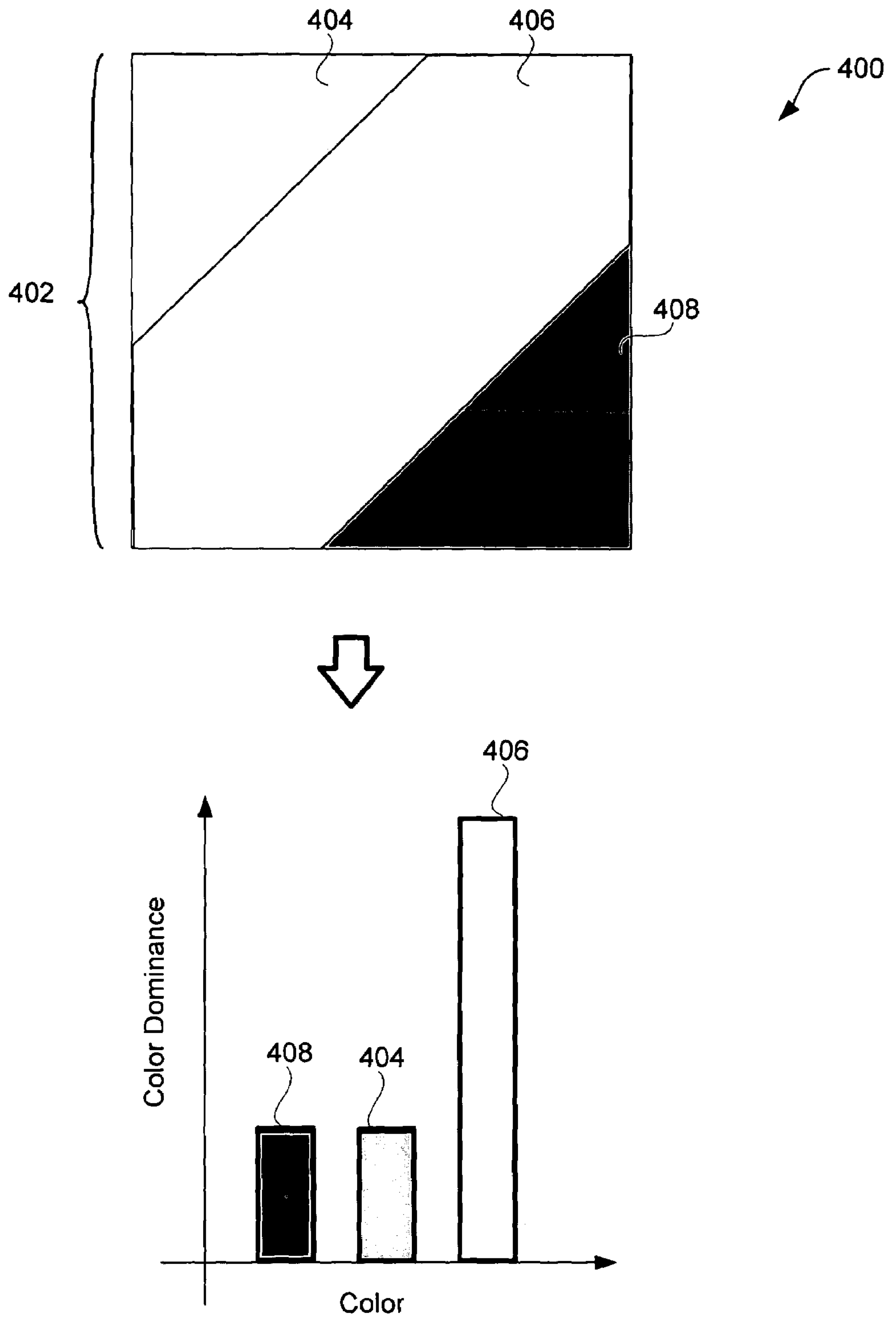
FIG. 4 illustrates an example of a dominant color analysis of a media asset illustration according to one embodiment of the invention.

FIG. 4 illustrates a simplified example of a dominant color analysis 400 of a media asset illustration 402 according to one embodiment of the invention. The analysis is accomplished by creating a histogram of all the colors contained in the media asset illustration 402, where the intensity/dominance of a color is indicated by the size of a color peak. In this example, there are three colors, indicated in the figure as color 404, color 406, and color 408. Below the media asset illustration 402, a histogram 430 is shown, indicating that color 406 is the dominant color in the media asset illustration 402. It will be understood by those familiar with the art that the histogram 420 is a highly simplified diagram and that a real illustration and corresponding histogram can include substantially more colors.

Figure 5:
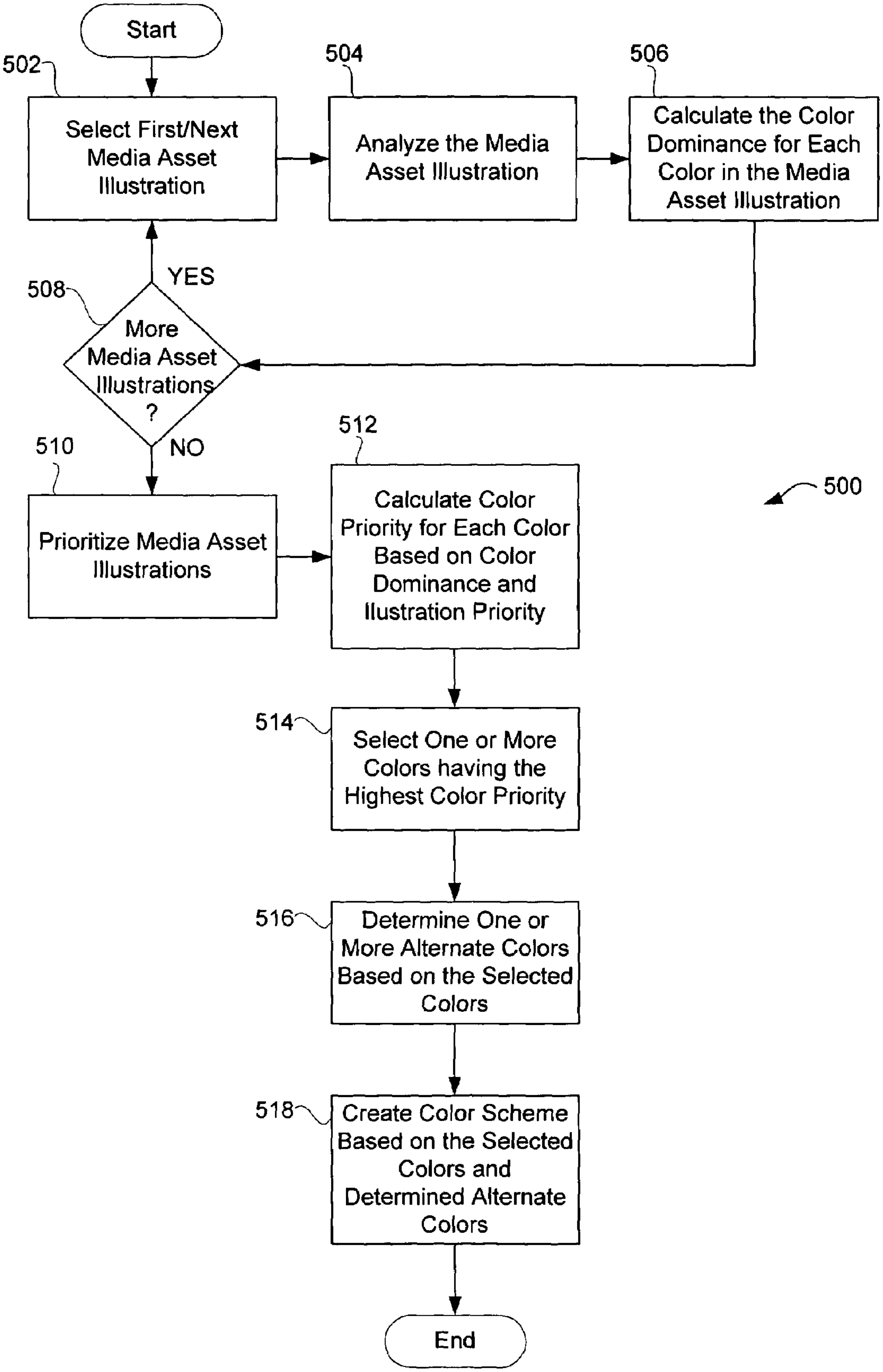
FIG. 5 is a flow diagram of a color scheme determination process according to one embodiment of the invention.

FIG. 5 is a flow diagram of a color scheme determination process 500 according to another embodiment of the invention. The color scheme determination process 500 determines a color scheme. As an example, the color scheme is used in the production 108 of a media asset illustration collage of FIG. 1. The color scheme determination process 500 typically operates on one or more media asset illustrations associated with a media asset list such as the media asset list 246 of FIG. 2C.

The color scheme determination process 500 begins by selecting 502 a media asset illustration. The media asset illustration is then analyzed 504, for example by taking a histogram of all the colors in the media asset illustration as shown in FIG. 4. Next, color dominance is calculated 506 for each of the colors in the media asset illustration. In some embodiments of the invention, the color dominance can correspond to a height of a histogram peak. Next, decision 508 determines if there are more media asset illustrations to be analyzed. If so, the decision 508 returns to repeat block 502 and subsequent blocks. If, on the other hand, there are no more media asset illustrations to be analyzed 504, the color scheme determination process 500 continues, to block 510, where the analyzed media asset illustrations are prioritized. The prioritization 510 occurs, for example, according to operation 304 as described above with reference to FIG. 3. However, various other prioritization schemes are possible.

Next, the color priority for each color in the analyzed media asset illustrations is calculated 512 based on the color dominance and the illustration priority as determined in blocks 506 and 510. In some embodiments of the invention, the color priority is calculated only for the most dominant colors in each media asset illustration, for example the top five most dominant colors of each media asset illustration. Next, one or more colors having the highest color priority are selected 514. The number of colors selected can be determined by user input (e.g., a user dialog), by an aesthetic determination made using a software program, or by other methods. In one embodiment of the invention, the color with the highest color priority is selected.

Once the one or more highest-priority colors have been selected 514, one or more alternate colors are determined 516 using well-known color theory principles (described below with reference to FIGS. 8A-8F.) In one implementation, the alternate colors that are determined 516 include one or more shades or tints of the selected highest-priority color/colors. In another implementation, one or more complements of the selected highest-priority colors are determined 516 as the alternate colors.

Upon determining 516 the one or more alternate colors, the color scheme determination process creates 518 a color scheme based on the selected highest-priority colors and determined alternate colors.

Figure 6A:
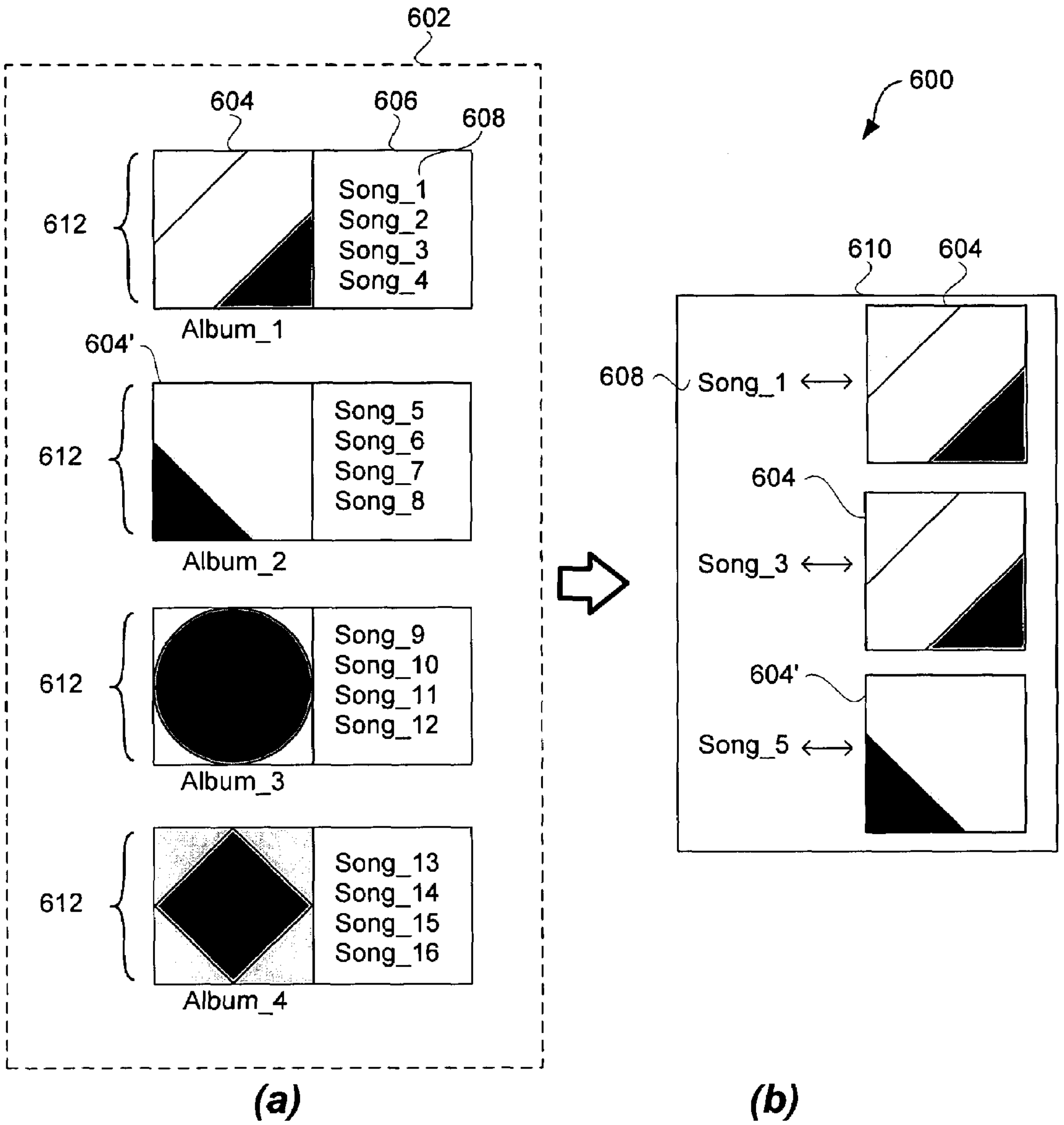
FIGS. 6A and 6B illustrate a color scheme determination example according to one embodiment of the invention.
Figure 6B:
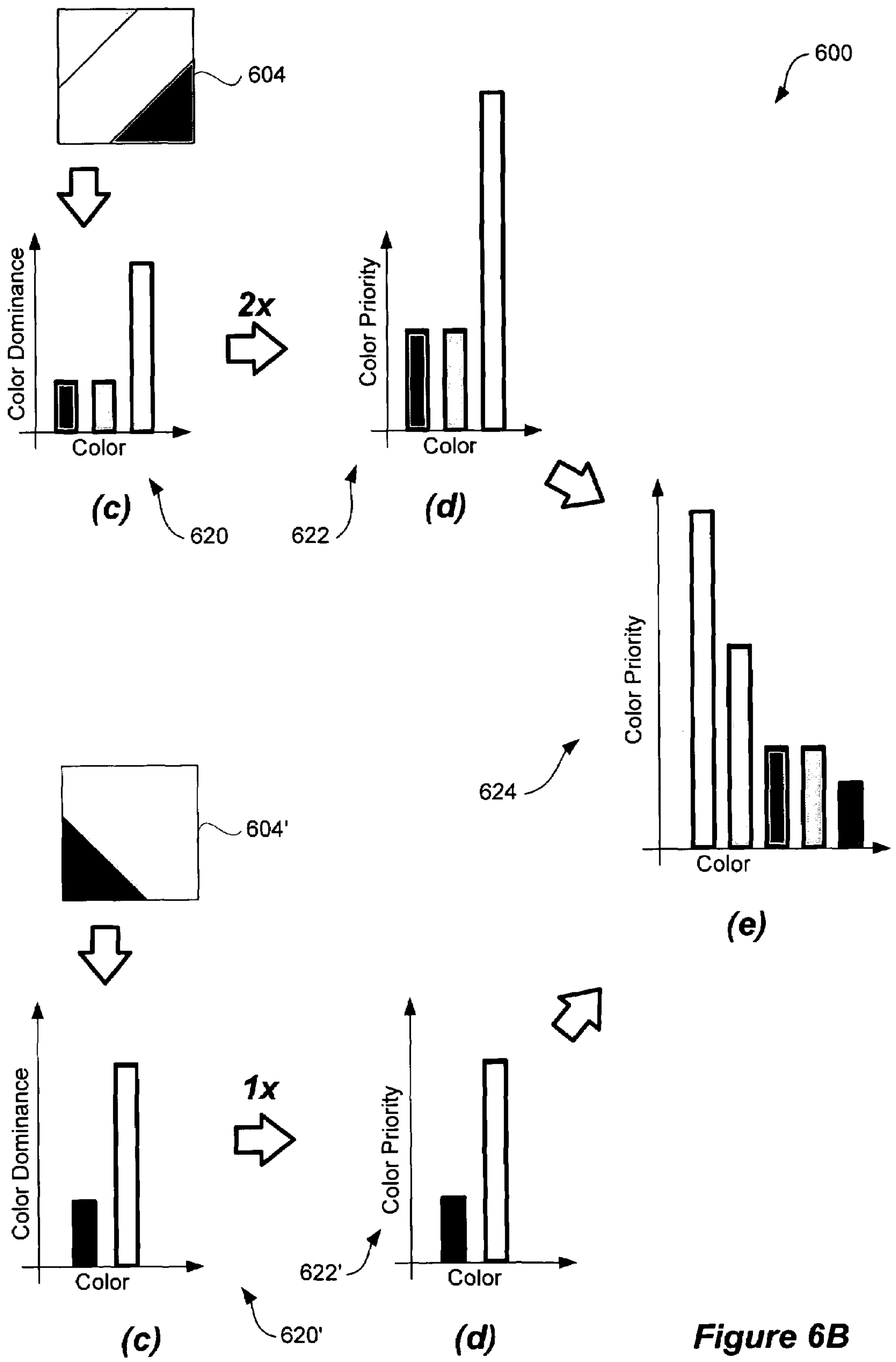

FIGS. 6A and 6B illustrate a color scheme determination example 600 according to one embodiment of the invention. This color scheme determination example 600 can, for example, correspond to the color scheme determination process 500 of FIG. 5 above.

The color scheme determination example 600 begins with an illustration of a media database 602 at step (a). The media database 602 contains media assets 608, such as music or video files. This particular media database 602 contains four media asset collections 612, (designated Album_1, Album_2, etc.). Each media asset collection 612 contains four media assets 608 (designated Song_1, Song_2, etc.) and a single media asset illustration 604. In the embodiment shown, the media assets 608 are music files (i.e., songs) and the media asset illustrations 604 are album cover graphics. Further, in some embodiments of the invention, the media assets 608 within media asset collections 612 are music albums by a single artist, music compilations by a variety of artists, or music collections consisting of several music albums by a single artist (commonly known as box sets). In some embodiments of the invention, the media asset collections 612 include multiple illustrations and/or graphics files, music files, video files, and liner notes.

The color scheme determination example 600 continues with an illustration of a media asset list 610 at step (b). The media asset list 610 contains three media assets 608 (Song_1 and Song_3 from Album_1, and Song_5 from Album_2) and two media asset illustrations (604 and 604') associated with the media assets 608 on the media asset list 610. Note that, in this illustration, both Song_1 and Song_3 come from the same media asset collection 612, namely Album_1, so both are associated with the same media asset illustration 604. Song_5, on the other hand, comes from Album_2 and is associated with a different media asset illustration 604'. The media asset list 610 is typically created by a user of a media management program in order to create a custom-made playlist for later playback.

In FIG. 6B, step (c) of the color scheme determination example 600 illustrates the analysis of media asset illustrations 604 and 604'. The analysis results in a color dominance histogram 620 for media asset illustration 604 and a second color dominance histogram 620' for media asset illustration 604'. In the example, the histogram peaks are directly proportional to the colors contained in the media asset illustrations and the total height of the histogram peaks in the color dominance histogram 620 is equal to the total height of the histogram peaks in the color dominance histogram 620'. Next, at step (d), the histogram peaks in the color dominance peaks 620 and 620' are adjusted according to an illustration priority analysis such as, for example, the prioritization 510 step of FIG. 5. The resulting color priority histograms (622 and 622') reflect the adjustment. In the illustration, media asset 604, which is associated with two media assets 608 (Song_1 and Song_3) has twice the priority of media asset 604', which is only associated with one media asset 608 (Song_5). Accordingly, the peaks in the color priority histogram 622 are twice (2×) the height of the peaks in the color dominance histogram 620. In contrast, the histogram peaks in the color priority histogram 622' are the same (1×) height as the histogram peaks in the color dominance histogram 620'.

In step (e), the final step of the example color scheme determination 600, the histogram peaks of the color priority histograms 622 and 622' are merged into a final color priority histogram 624. Note that the tallest peak in this example 600 is the dominant color of the media asset illustration 604, which is associated with the media assets 608, Song_1 and Song_3, taken from Album_1. In some embodiments of the invention, steps (d) and (e) can correspond to the calculation 512 of color priority as described in FIG. 5.

Figure 7A:
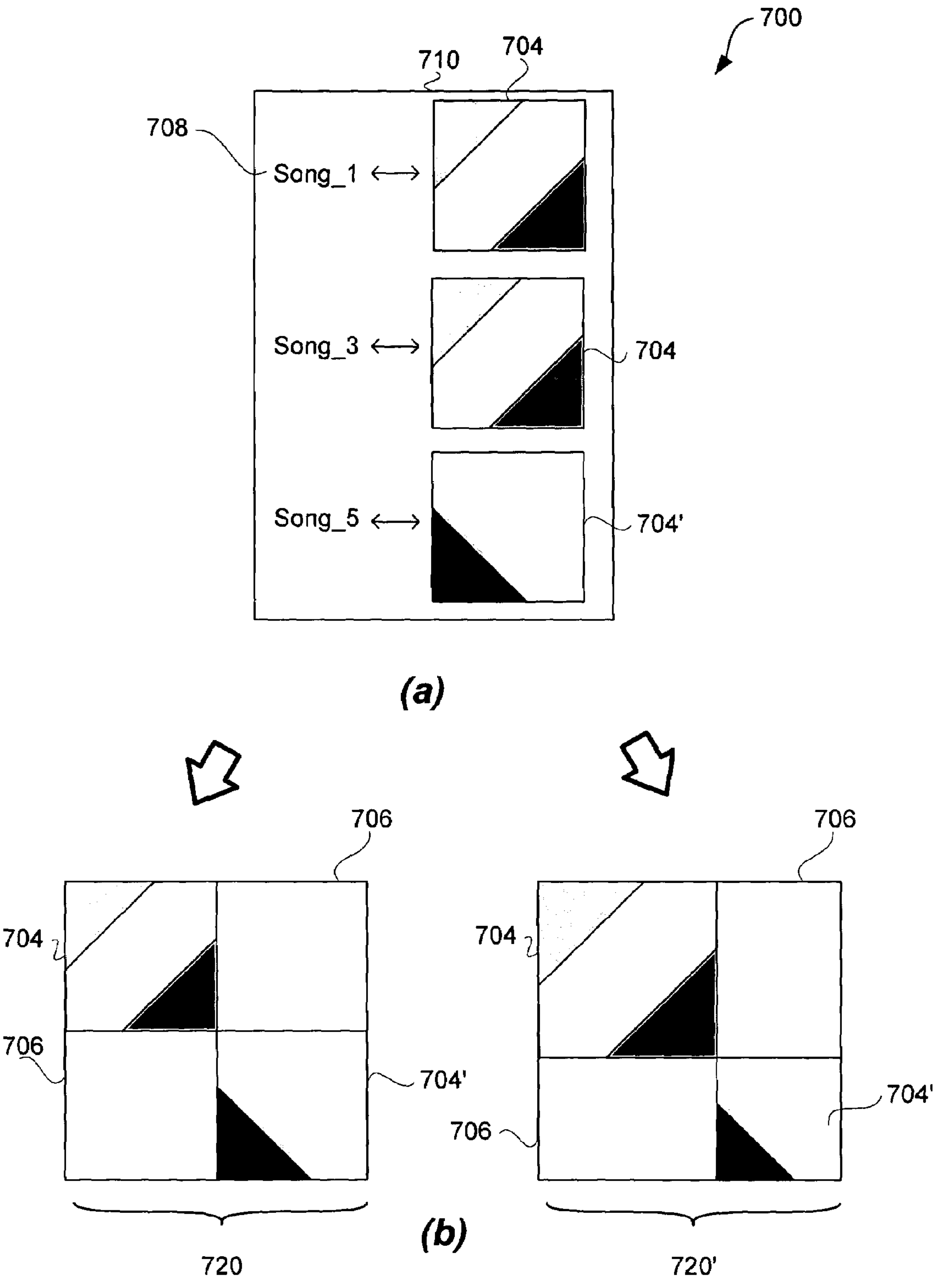
FIGS. 7A-7B are media asset illustration collage production examples according to various embodiments of the invention.

FIG. 7A is a media asset illustration collage production example 700 according to one embodiment of the invention. The media asset illustration collage production example 700 can, for example, correspond to the producing 108 of a media asset illustration collage of FIG. 1.

The media asset illustration collage production example 700 begins with a media asset list 710 in step (a), which is similar to the media asset list 610 described with reference to FIG. 6A.

Next, in step (b), two different media asset illustration collages 720 and 702' are shown. It is understood that these collages are exemplary and that various other arrangements are possible within the scope of the invention. Generally, only one type of collage will be produced (i.e., either 720 or 720', not both). In some embodiments of the invention, a user controls the type of collage produced by interacting with a software application. Alternately, in some embodiments, the type of collage produced is randomly determined by an application. Applications suitable for use with these embodiments include media management applications, for example iTunes®.

In step (b), a media asset illustration collage 720 (mosaic) is formed in a grid pattern consisting of media asset illustrations 604 and 604'. In media asset illustration collage 720, the media asset illustration is shown with both media assets having the same size. Additionally, blank spaces 706 are indicated. In some embodiments of the invention, the blank spaces 706 are filled with a color from a color scheme, for example the color scheme created 518 in FIG. 5.

Alternately, a media asset illustration collage 720' is shown. In this embodiment, media asset illustration priority (as described in operation 510 of FIG. 5) is indicated in the media asset illustration collage by the relative sizes of the media asset illustrations 704 and 704'. As described above in step (d) of the color scheme determination example 600, the media asset illustration priority can be determined by counting the number of media assets 708 associated with each media asset illustration 704. In the media asset illustration collage production example 700, media asset illustration 704 has twice as many media assets associated with it as media asset illustration 704'. Accordingly, in this embodiment, the media asset illustration 704 is shown in the media asset illustration collage 720' as having about twice the area of the media asset illustration 704'. A third alternative (not shown) uses only the media asset illustration with the highest priority and completely omits lower priority images. For example, in this embodiment, the media asset illustration collage will show only media asset illustration 704.

Figure 7B:
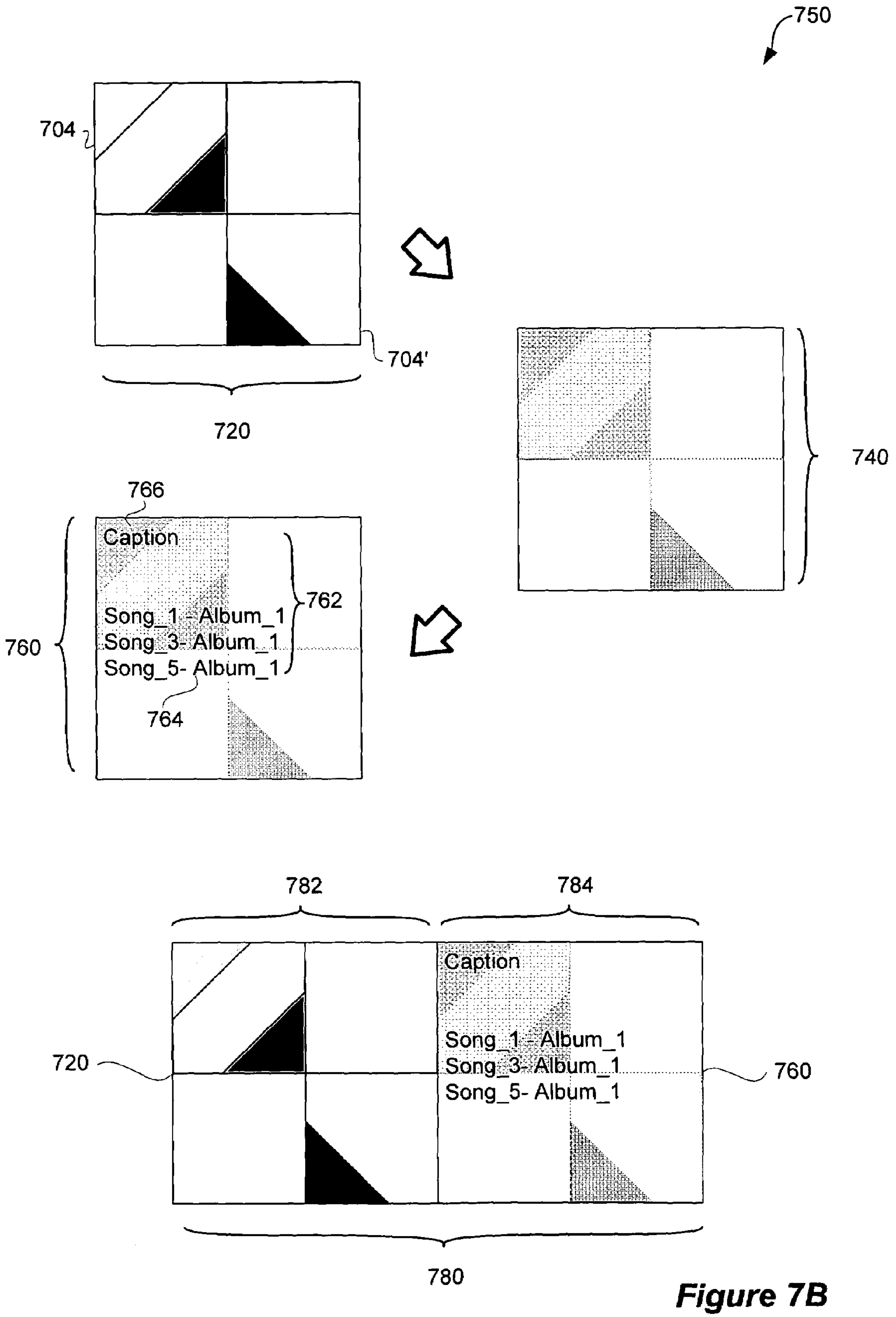

FIG. 7B illustrates a media asset illustration collage production example 750 according to another embodiment of the invention. The media asset illustration collage production example 700 can, for example, correspond to the producing 108 of a media asset illustration collage of FIG. 1.

The media asset illustration collage production example 750 begins with a media asset illustration collage, namely, the media asset illustration collage 720 of FIG. 7A. Next, according to this embodiment, the media asset illustration collage can be converted to a background media asset illustration collage 740. In one embodiment of the invention, the conversion to a background image is accomplished by using tints and shades of the highest priority color from the media asset illustrations 704 and 704' in the media asset illustration collage 720. The highest priority color can be determined, for example as discussed above in reference to FIGS. 5, 6A, and 6B. Alternately, in some embodiments of the invention, the background media asset illustration collage 740 is created by using colors selected from a color scheme, such as the color scheme as determined 106 in FIG. 1, the color scheme as created 308 in FIG. 3, or the color scheme as created 518 in FIG. 5.

Next, in one embodiment of the invention, a media asset illustration collage 760 can be produced. The media asset illustration collage 760 can incorporate the background media asset illustration collage 740 as described above. Additionally, the media asset illustration collage 760 incorporates a track listing 762. The track listing 762 includes at least the titles 764 of the media assets in the media asset list that was used to create the media asset illustration collage 720 of the background media asset illustration collage 760. In the media asset illustration production example 750, the titles 764 listed in the media asset illustration collage 760 are the titles of the media assets 708 in the media asset list 710 illustrated in FIG. 7A. Additionally, the media asset illustration collage 760 incorporates a caption 766, which is generally a title or label selected by the user to describe the collection of media assets listed in the track listing.

Alternately, in another implementation, a media asset illustration collage 780 can be produced. Essentially, the media asset illustration collage 780 incorporates the features of the media asset illustration collage 720 into a first panel 782 and the media asset illustration collage 760 into a second panel 784. In implementations where the media asset illustration collage 780 is used as a CD jewel case insert, one panel is inserted into the front insert of the jewel case and the other panel is inserted into the back insert of the jewel case.

FIGS. 8A-8F are illustrations of color selection methods according to one embodiment of the invention. Each color selection method is shown on a standard color wheel 802. One or more of these described color selection methods can be used in the creation of a color scheme, for example as described with reference to block 308 of FIG. 3 or block 518 of FIG. 5.

The color wheel 802 is set up in the traditional manner, showing the primary, secondary, and tertiary colors they are commonly arranged. It is noted that printers commonly define the primary colors as cyan, magenta, yellow, and black (CMYK). Also, when discussing colors on most video display panels and monitors, colors are defined in terms of red, green, and blue (RGB). However, the primary colors, in the context of this invention are the commonly known primary colors as defined by visual artists (i.e., painters), i.e., red (R), yellow (Y) and green (G). It is understood that, although CMYK and RGB color theory are not discussed here, the invention can use CMYK and RGB generated colors as well as other color description terms not discussed herein.

In the standard color wheel 802, the three primary colors are arranged such that they are 120° apart. Next, the three secondary colors are obtained by combining any two adjacent primary colors—red and yellow are combined to form orange (O), yellow and blue are combined to form green (G), and red and blue are combined to form violet (V). The secondary colors are each placed on the color wheel 802 halfway between the two primary colors used to form them. The tertiary colors are formed by combining a primary color and an adjacent secondary color. These colors are yellow-orange (Y-O), red-orange (R-O), red-violet (R-V), blue-violet (B-V), blue-green (B-G), and yellow-green (Y-G). It is understood that there are an infinite number of intermediate colors and that the use of twelve colors shown in the color wheel 802 are for explanatory purposes and not intended to limit the invention to those colors.

Figure 8A:
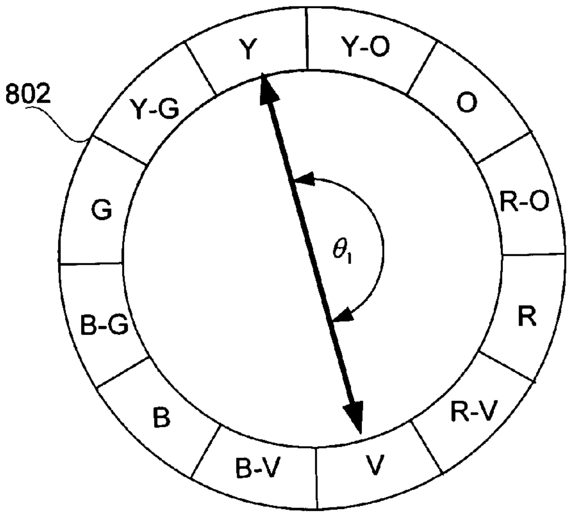
FIGS. 8A-8F are illustrations of color selection methods according to several embodiments of the invention.

FIG. 8A illustrates the selection of a color complement. Complimentary colors are those that are found directly opposite each other (180° apart) on the color wheel. By way of example, FIG. 8A shows that yellow (Y) and violet (V) are complements. It is commonly understood that complementary colors provide a high level contrast between the complements. According to some embodiments of the invention, a dominant color's complement is selected as an alternate color during a color scheme determination process, for example operation 516 of the color scheme determination process 500 of FIG. 5.

Figure 8B:
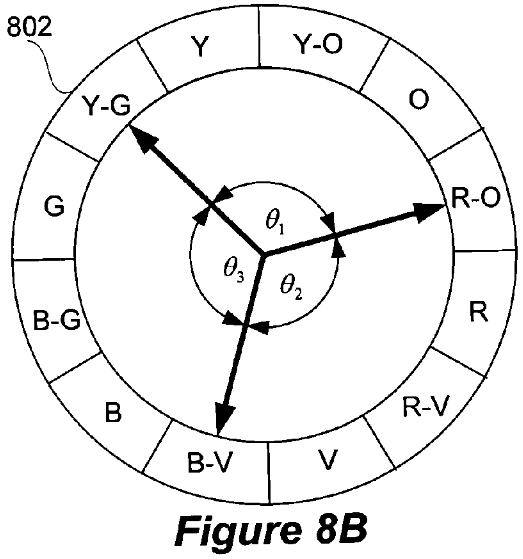

FIG. 8B illustrates the selection of a color triad 820, which is defined as three colors evenly spaced on the color wheel 802 (120° apart). The most commonly known color triad is the primary color triad of red, yellow, and blue. However, any three evenly spaced colors can constitute a color triad. According to some embodiments of the invention, a triad of colors based on a dominant color is selected to determine alternate colors during a color scheme determination process, for example operation 516 of the color scheme determination process 500 of FIG. 5.

Figure 8C:
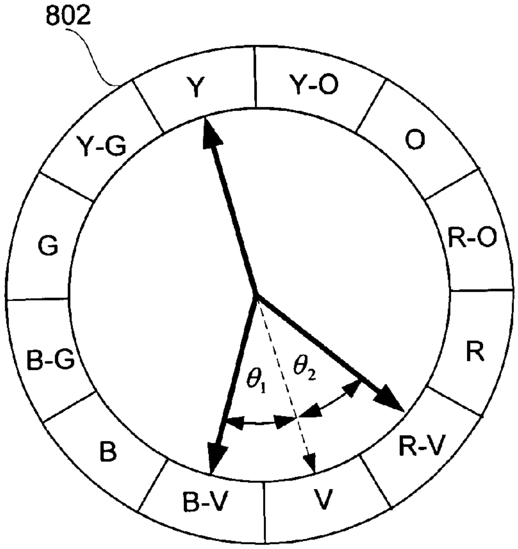

FIG. 8C illustrates the selection of split complements of a given color. Split complements are commonly defined as colors on either side of a color's complement. As shown in FIG. 8C, the split complements of yellow, (Y) are the colors on either side of violet (V), i.e., red-violet (R-V) and blue-violet (B-V).

It is noted that the split complements of a color fall within a color range and are not as precisely defined as a color's complement and the color triads discussed above. For the purposes of this invention, split complements are taken to be two colors on either side of a first color's complement, where the two colors have equal angular displacement from the complement and the two colors are aesthetically compatible with the first color. In the case of traditional split complements, the two colors will be no more than 90° apart on the color wheel 802 and no more than 45° from the complement. However, any two equally distant colors may be used, as long as they are aesthetically compatible with the first color. According to some embodiments of the invention, the split complements of a dominant color are selected as alternate colors during a color scheme determination process, for example operation 516 of the color scheme determination process 500 of FIG. 5.

Figure 8D:
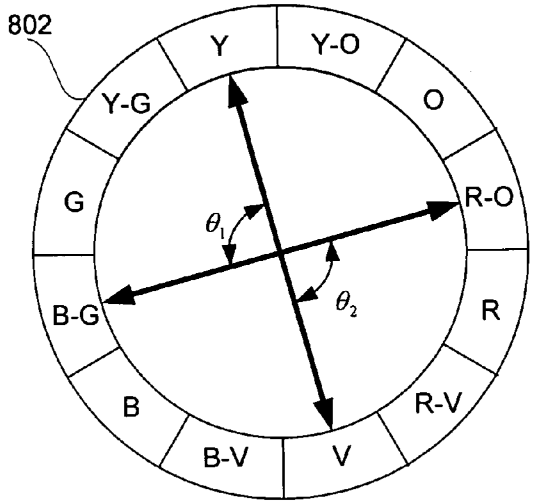

Additionally, a fourth color selection method employing color tetrads may be used as shown in FIG. 8D. A tetrad is defined as a color harmony based on four evenly spaced colors (90° apart) on the color wheel 802. According to some embodiments of the invention, a tetrad of colors based on a dominant color is selected to determine alternate colors during a color scheme determination process, for example operation 516 of the color scheme determination process 500 of FIG. 5.

Figure 8E:
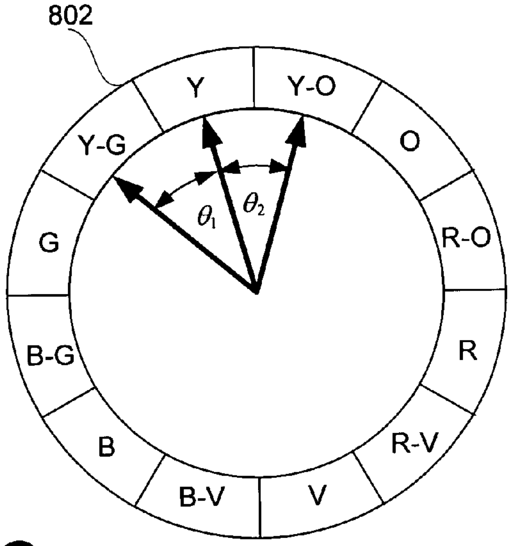

Another color selection method, shown in FIG. 8E, uses analogous colors. Analogous colors are colors located adjacent to a given color. The selection of analogous colors is similar to the selection of split complements in that the analogous colors are equally spaced radially For example, looking at the color wheel 802, the analogous colors of red are red-orange and red-violet.

For the purposes of this invention, analogous colors are taken to be two colors on either side of a given first color, where the two colors have equal angular displacement from the first color and the two colors are aesthetically compatible with the first color. In the case of traditional analogous colors, the two colors will be no more than 90° apart on the color wheel 802 and no more than 45° from the first color. However, any two equally distant colors may be used, as long as they are aesthetically compatible with the first color. According to some embodiments of the invention, the analogous colors of a dominant color are selected as alternate colors during a color scheme determination process, for example operation 516 of the color scheme determination process 500 of FIG. 5.

Figure 8F:
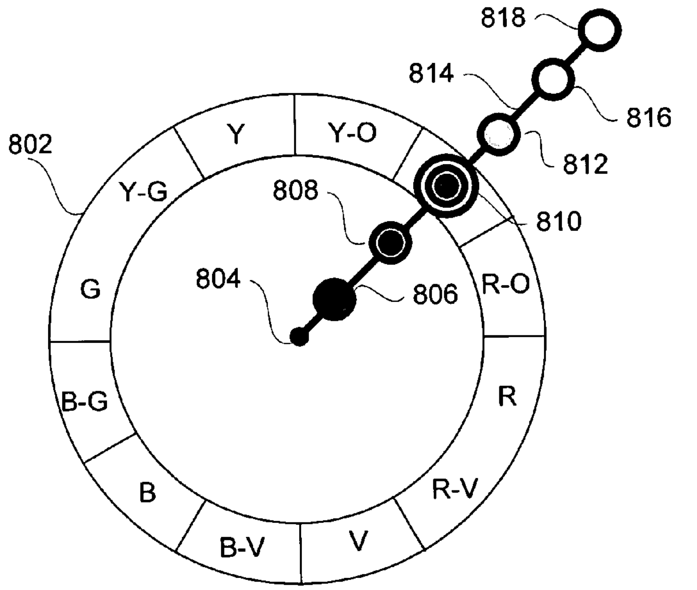

FIG. 8F illustrates the selection of tints and shades of a given color. The importance of tints and shades becomes clear when trying to describe a monochromatic color scheme. By definition, a monochromatic color scheme is limited to a single color. However, all tints and shades of that color are part of a monochromatic color scheme. The most commonly seen monochromatic color scheme is grayscale (also known as black and white), although a monochromatic color scheme can be based on any color.

In common color terminology, a color's value indicates how light or dark a color is. Typically, the value scale ranges from 0 to 10 with infinite graduations in between. Generally, high values are lighter while low values indicate darker colors. If white is added to a first color to make it lighter, the new color is referred to as a tint of the first color. Alternately, if black is added to a first color to make it darker, the new color is called a shade of the first color.

By way of example, FIG. 8F illustrates shades and tints of a color along a color value line 814 running radially away from the center of a color wheel 802. The color value line 814 begins at the center of the color wheel 802 and radiates outward. The beginning point 804 of the color value line 814 represents a color value of 0 (black). At the other end of the color value line 814 is a color 818 representing a color value of 10 (white). For this illustration, an arbitrarily chosen color 810 on the color wheel 804 is shown. In this example the base color 810 is located in the orange (O) region of the color wheel 802. For the purposes of this example, the color 804 is given a value of 5, indicating that it is at the midpoint of the color value line 814. Between colors 810 and 818 are color 812 and color 816, which are tints of the base color 810, with values between 5 and 10, and with color 816 having a higher value than color 812. At the other end of the color value line 814, colors 806 and 808 are shown. Both color 806 and color 808 are shades of the color base color 810, with values between 0 and 5 and with color 806 having a lower value than color 808. According to some embodiments of the invention, one or more shades or tints of a dominant color are selected as alternate colors during a color scheme determination process, for example operation 516 of the color scheme determination process 500 of FIG. 5.

Note that neither black nor white appear on the color wheel 802. However, when using the value scale, all colors of value 10 are white, while all colors of value 0 are black.

Figure 9:
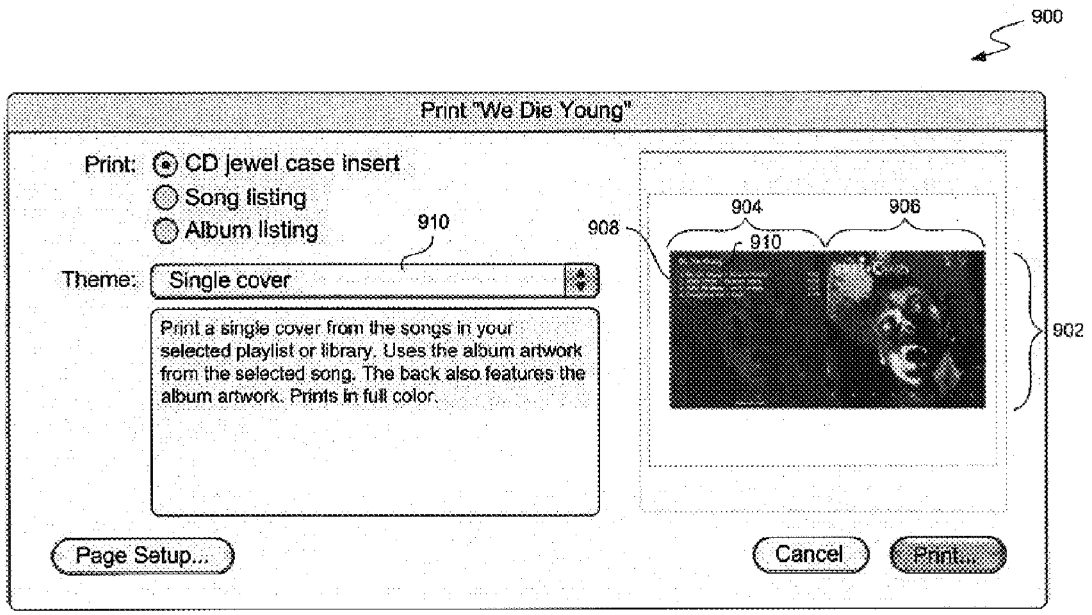
FIG. 9 is a screenshot of an iTunes® dialog window showing a user interface for printing a media asset illustration collage (e.g., a CD jewel case insert) using four media asset illustrations.

FIG. 9 is a screenshot of a dialog window showing a user interface 900 for printing a media asset illustration collage 902 (e.g., a CD jewel case insert) using a single media asset illustration. The media asset illustration collage 902 is produced according to one or more of the embodiments above as described in FIGS. 1 to 8F. According to one embodiment of the invention, a playlist of songs, for example the media asset list 710 of FIG. 7A, is used to create a media asset illustration collage 902. The media asset illustration collage 902 includes a front panel 906 and a back panel 904. The front panel 906 is a single album cover art graphic. The option to create a front panel 906 using only a single album cover art graphic is selected by a user from a theme menu 910 (e.g., a pop-up menu). The back panel 904 is a monochromatic reproduction of the album cover art graphic on the front panel 906, created using a color scheme based on one or more colors found on the album cover art graphic. Additionally, the back panel 904 includes a track listing 908 and a compilation title 910.

Figure 10:
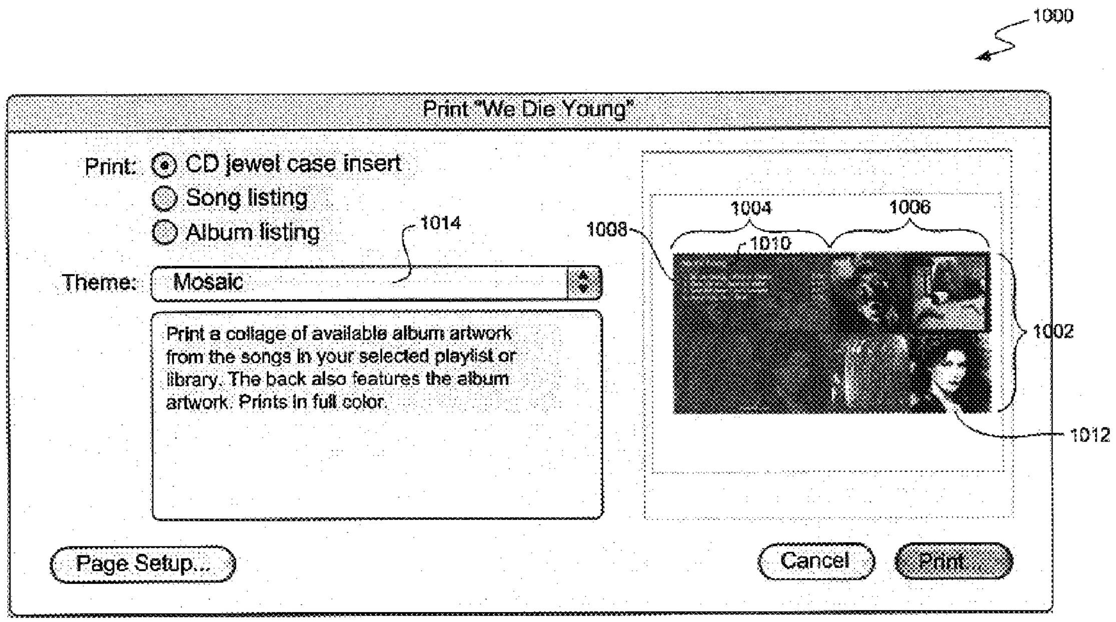
FIG. 10 is a screenshot of an iTunes® dialog window showing a user interface for printing a media asset illustration collage (e.g., a CD jewel case insert) using four media asset illustrations.

FIG. 10 is a screenshot of a user interface 1000 for printing a media asset illustration collage 1002 (e.g., a CD jewel case insert) using four media asset illustrations. The media asset illustration collage 1002 is produced according to one or more of the embodiments above as described in FIGS. 1 to 8F.

According to one embodiment of the invention, a playlist of songs, for example the media asset list 710 of FIG. 7A, is used to create a media asset illustration collage 1002. The media asset illustration collage 1020 includes a front panel 1006 and a back panel 1004. The front panel 1006 is a mosaic of four album cover art graphics 1012. The option to create a front panel 1006 using a mosaic of album cover art graphic is selected by a user from a theme menu 1014 (e.g., a pop-up menu). As discussed above, other arrangements include grids and overlays, as well as other patterns. The back panel 1004 is a monochromatic reproduction of the front panel mosaic, created using a color scheme based on one or more of the colors found in one or more of the album cover art graphics 1012. Additionally, the back panel includes a track listing 1008 and a compilation title 1010.

Figure 11:
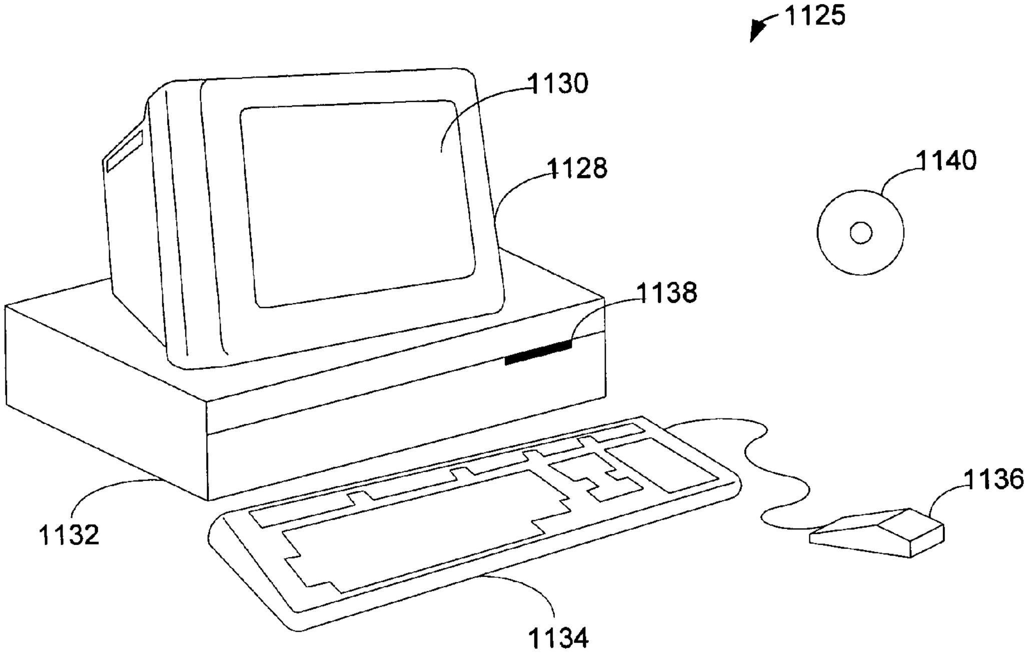
FIG. 11 shows an exemplary computer system suitable for use with the invention.

FIG. 11 shows an exemplary computer system 1125 suitable for use as a client according to one embodiment of the invention. The computer system 1125 includes a display monitor 1128 having single or multi-screen displays 1130 (or multiple displays), cabinet 1132, keyboard 1134, and mouse 1136. Cabinet 1132 houses a drive 1138, such as a CD-ROM, or floppy drive, system memory and a hard drive (not shown) which may be utilized to store and retrieve software programs incorporating computer code that implements the present invention, data for use with the invention, and the like. Although CD-ROM 1140 is shown as an exemplary computer readable storage medium, other computer readable storage media including CD-R, CD-RW, DVD, DVD-R, DVD-RW, floppy disk, tape, flash memory, system memory, and hard drive may be utilized. In one implementation, an operating system for the computer system 1125 is provided in the system memory, the hard drive, the CD-ROM 1140 or other computer readable storage medium and serves to incorporate the computer code that implements the invention.

The advantages of the invention are numerous. Different embodiments or implementations may, but need not, yield one or more of the following advantages. One advantage of an embodiment of the present invention is that aesthetically pleasing color media inserts or labels may be created without users having to select appropriate color schemes or even understand color selection theory. This invention will be especially appreciated by those who have difficulty perceiving color due to some degree of color blindness or by those do not wish to spend the time selecting colors for a media asset illustration collage manually.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for producing a media asset illustration collage, comprising:

obtaining a media asset list containing media asset information;

obtaining a plurality of media asset illustrations associated with the media asset list;

determining a color scheme based on the plurality of media asset illustrations; and producing a media asset illustration collage according to the color scheme, wherein the determining of the color scheme comprises:

analyzing each of the plurality of media asset illustrations;

determining, based on the analysis, one or more dominant colors for each of the media asset illustrations;

prioritizing each of the media asset illustrations based on the media asset list, the media asset illustration having the highest priority being most representative of the media asset illustrations associated with the media asset list;

selecting one or more the of the determined dominant colors from the media asset illustration having the highest priority; and creating the color scheme for the media asset illustration collage based on the selected dominant color.

2. A computer-implemented method as recited in claim 1, further comprising:

printing the media asset illustration collage.

3. A computer-implemented method as recited in claim 1, further comprising:

producing a track listing containing media asset information from the media asset list; and incorporating the track listing into the media asset illustration collage.

4. A computer-implemented method as recited in claim 3, further comprising printing the media asset illustration collage.

5. A computer-implemented method as recited in claim 4, wherein the media asset illustration collage is a jewel case insert.

6. A computer-implemented method as recited in claim 4, wherein the media asset illustration collage is a DVD case insert.

7. A computer-implemented method as recited in claim 1, wherein the determining of the color scheme comprises:

determining, based on the one or more of the dominant colors, one or more alternate colors for at least the media asset illustration having the highest priority.

8. A method as recited in claim 1, wherein the priority for the media asset illustrations is determined by counting the number of media assets on the media asset list that are associated with each of the media asset illustrations and assigning the highest priority to the media asset illustration having the greatest number of associated media assets.

9. A computer-implemented method as recited in claim 1, wherein the processing of the media asset illustrations comprises generating a histogram of the colors contained in each of the media asset illustrations.

10. A computer-implemented method as recited in claim 9, wherein the dominant color is determined by selecting one or more of the tallest peaks on the histogram.

11. A computer-implemented method as recited in claim 8, wherein the color scheme is formulated by selecting one or more shades of the dominant color of the highest priority illustration.

12. A computer-implemented method as recited in claim 8, wherein the track listing is printed using an alternate color of the dominant color of the highest priority illustration.

13. A computer-implemented method as recited in claim 1, wherein the media asset illustration collage comprises a first panel and a second panel.

14. A computer-implemented method as recited in claim 1, wherein the determination of one or more of the alternate colors comprises choosing a complement color of a dominant color.

15. A computer-implemented method as recited in claim 1, wherein the determination of one or more of the alternate colors comprises choosing a shade of a dominant color.

16. A computer-implemented method as recited in claim 1, wherein the determination of one or more of the alternate colors comprises choosing a tint of a dominant color.

17. A computer-implemented method as recited in claim 1, wherein the determination of one or more of the alternate colors comprises choosing the split complements of a dominant color.

18. A computer-implemented method as recited in claim 1, wherein the determination of one or more of the alternate colors comprises choosing the alternate complements of a dominant color.

19. A computer-implemented method as recited in claim 1, wherein the determination of one or more of the alternate colors comprises choosing the tetrads of a dominant color.

20. A computer-implemented method as recited in claim 1, wherein the color scheme is formulated by selecting one or more tints of the dominant color of the highest priority illustration.

21. A computer-implemented method as recited in claim 13, wherein the first panel comprises a mosaic of all the media asset illustrations associated with the media asset list.

22. A computer-implemented method as recited in claim 13, wherein the second panel comprises the mosaic reproduced using only the colors in the color scheme.

23. A computer-implemented method as recited in claim 13, wherein the second panel is produced using the dominant color.

24. A computer-implemented method as recited in claim 21, wherein the mosaic of media asset illustrations contains blank spaces, and wherein the blank spaces are filled with the selected dominant color.

25. A computer-implemented method as recited in claim 22, wherein the color scheme is a monochromatic color scheme based on the selected dominant color.

26. A computer-implemented method as recited in claim 23, wherein the monochromatic color scheme comprises shades of the selected dominant color.

27. A computer-implemented method as recited in claim 26, wherein the second panel further comprises a track listing produced using an alternate color.

28. A computer-implemented method as recited in claim 26, wherein the monochromatic color scheme further comprises tints of the dominant color.

29. A computer-implemented method as recited in claim 27, wherein the alternate color is the complement of the selected dominant color.

30. A computer-implemented method as recited in claim 23, wherein the second panel further comprises a track listing produced using an alternate color.

31. A computer-implemented method as recited in claim 30, wherein the alternate color is the complement of the selected dominant color.

32. A computer-implemented method for producing a media asset illustration collage, comprising:

obtaining a playlist containing media asset information for a plurality of media assets;

obtaining a plurality of media asset illustrations associated with the playlist;

analyzing the media asset illustrations;

determining, based on the analysis, one or more dominant colors for each of the media asset illustrations;

determining, based on one or more of the dominant colors, one or more alternate colors for each of the media asset illustrations;

prioritizing the media asset illustrations based on how many of the media assets in the playlist correspond to the each of the media asset illustrations;

selecting one or more the of the determined dominant colors from the media asset illustration having the highest priority;

creating a color scheme for the media asset illustration collage based on the selected dominant color; and producing a media asset illustration collage according to the color scheme.

33. A computer readable medium including at least executable software code tangibly stored thereon for producing a media asset illustration collage, the computer readable medium comprising:

software code for obtaining media asset list containing media asset information;

software code for obtaining a plurality of media asset illustrations associated with the media asset list;

software code for determining a color scheme based on the plurality of media asset illustrations; and software code for producing a media asset illustration collage according to the color scheme, wherein said software code for determining of the color scheme includes at least software code for prioritizing each of the media asset illustrations in the media asset list based on the frequency of occurrence of the media asset illustration in media asset list;

software code for determining a dominant color for at least the media asset illustration having the highest priority;

software code for determining, based on the dominant color, an alternate color for the media asset illustration having the highest priority; and software code for creating the color scheme for the media asset illustration collage based on the determined alternate color.

34. The computer readable medium as recited in claim 33, wherein wherein the color scheme produced by said software code for producing the media asset illustration collage according to the color scheme includes a background color in the determined alternate color.

* * * * *